(12) United States Patent
Itoh

(10) Patent No.: US 10,313,605 B2
(45) Date of Patent: Jun. 4, 2019

(54) IMAGE PROCESSING APPARATUS AND CONTROL METHOD THEREOF FOR GENERATING HIGH DYNAMIC RANGE IMAGE DATA

(71) Applicant: CANON KABUSHIKI KAISHA, Tokyo (JP)

(72) Inventor: Yasuhiro Itoh, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/609,475

(22) Filed: May 31, 2017

(65) Prior Publication Data

US 2017/0366729 A1    Dec. 21, 2017

(30) Foreign Application Priority Data

Jun. 15, 2016 (JP) ................................. 2016-119150
Mar. 21, 2017 (JP) ................................. 2017-054872

(51) Int. Cl.
| | | |
|---|---|---|
| *H04N 5/235* | (2006.01) | |
| *G06T 5/50* | (2006.01) | |
| *H04N 5/202* | (2006.01) | |
| *G06K 9/46* | (2006.01) | |
| *G06T 5/00* | (2006.01) | |

(52) U.S. Cl.
CPC ......... *H04N 5/2355* (2013.01); *G06K 9/4642* (2013.01); *G06K 9/4661* (2013.01); *G06T 5/009* (2013.01); *G06T 5/50* (2013.01); *H04N 5/202* (2013.01); *G06T 2207/20208* (2013.01)

(58) Field of Classification Search
CPC ........ H04N 5/2355; H04N 9/69; H04N 5/202; H04N 5/23232; H04N 5/355; H04N 5/35536; H04N 5/35545; H04N 5/35554; H04N 5/35563; H04N 5/35572; H04N 5/35581; G06K 9/4642; G06K 9/4661; G09G 2320/0673; G09G 2320/0276; G06T 5/50; G06T 5/009; G06T 2207/20208
USPC .................................................. 382/169, 274
See application file for complete search history.

(56) References Cited

U.S. PATENT DOCUMENTS

| | | | |
|---|---|---|---|
| 8,965,120 B2 * | 2/2015 | Yamanaka | G06T 5/003 |
| | | | 382/167 |
| 2001/0007599 A1 * | 7/2001 | Iguchi | G06T 5/009 |
| | | | 382/274 |

(Continued)

FOREIGN PATENT DOCUMENTS

JP    2002-190983 A    7/2002

*Primary Examiner* — Albert H Cutler
(74) *Attorney, Agent, or Firm* — Venable LLP

(57) ABSTRACT

An image processing apparatus includes a first composition unit which generates a first HDR image by applying a first gamma to each of a plurality of images different in exposure amount and composing the plurality of images after the application of the first gamma, a determination unit which determines whether one preset image among the plurality of images includes a light region satisfying a preset condition, a generation unit which generates, based on the light region, map data for discriminating the light region, a dark region, and an intermediate region, and a second composition unit which generates a second HDR image by applying a second gamma to one of the plurality of images, and composing, with reference to the map data, an image obtained by applying the second gamma and the first HDR image data.

11 Claims, 12 Drawing Sheets

(56) References Cited

U.S. PATENT DOCUMENTS

| | | | |
|---|---|---|---|
| 2004/0051790 A1* | 3/2004 | Tamaru | H04N 5/202 |
| | | | 348/223.1 |
| 2005/0041138 A1* | 2/2005 | Suzuki | H04N 5/235 |
| | | | 348/362 |
| 2005/0046708 A1 | 3/2005 | Lim et al. | |
| 2010/0226547 A1* | 9/2010 | Criminisi | G06K 9/38 |
| | | | 382/128 |
| 2012/0008006 A1* | 1/2012 | Muramatsu | H04N 5/202 |
| | | | 348/222.1 |
| 2012/0262600 A1* | 10/2012 | Velarde | H04N 5/2355 |
| | | | 348/223.1 |
| 2014/0022408 A1* | 1/2014 | Nashizawa | H04N 5/2355 |
| | | | 348/222.1 |
| 2016/0093091 A1 | 3/2016 | Itoh | |
| 2017/0094145 A1* | 3/2017 | Miketa | H04N 5/2351 |
| 2017/0206690 A1 | 7/2017 | Itoh | |
| 2018/0358974 A1* | 12/2018 | Furuta | H03M 1/12 |

* cited by examiner

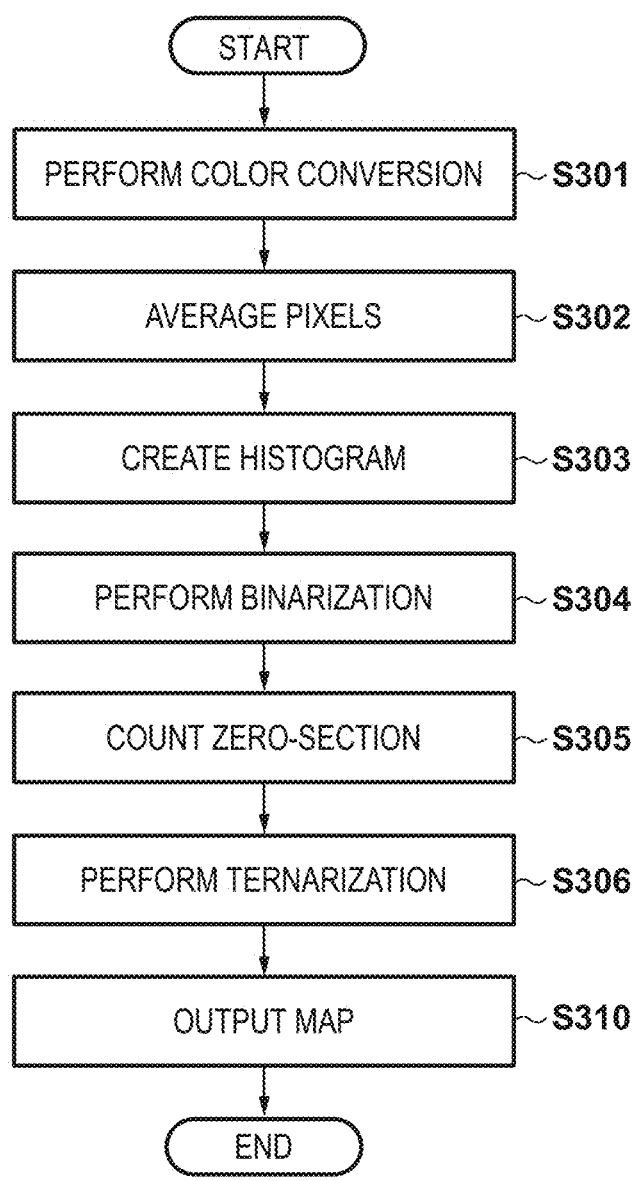

IMAGE PROCESSING APPARATUS AND CONTROL METHOD THEREOF FOR GENERATING HIGH DYNAMIC RANGE IMAGE DATA

BACKGROUND OF THE INVENTION

Field of the Invention

The present invention relates to a technique of extending the dynamic range of an image captured by a video camera, a digital camera, or the like.

Description of the Related Art

Conventionally, several image composition processing methods for obtaining a video with a wide dynamic range by composing a plurality of images different in exposure have been proposed.

For example, gain adjustment for matching an image of a short exposure time (short-duration shot image) with an image of a long exposure time (long-duration shot image) in characteristic is performed on a plurality of images different in exposure time at the time of shooting. Japanese Patent Laid-Open No. 2002-190983 (to be referred to as literature 1 hereinafter) proposes a method of obtaining an image with a wide dynamic range by subsequently composing images.

In addition, U.S. Patent Application Publication No. 2005/046708 (to be referred to as literature 2 hereinafter) proposes a method of applying a local filter to the surroundings of a pixel of interest, comparing variance values of a local region between images different in exposure time, and increasing a composition ratio at the time of image composition in accordance with the heights of the variance values. In this method, it is judged which of the images each having the different exposure time for each pixel could be shot without causing less pixel saturation, and contrivance to use the pixel with a lower possibility of pixel saturation for composition is made.

A case will be considered here in which a scene to be shot has an extremely large dynamic range, and a brightness distribution is divided into two portions, a light portion and a dark portion. It is easy to understand if considering, for example, a scene that includes both indoors and outdoors applies to this case.

FIG. 14 shows an example of the histogram of a scene in this case. In FIG. 14, a horizontal axis indicates luminance in the scene (image), a vertical axis indicates the frequency of a pixel, a solid line indicates a luminance distribution of the scene, and a dotted line indicates gamma. If the brightness distribution of the scene is divided into two, many of pixels concentrate near the lower limit and upper limit of pixel values, and a halftone portion tends to include less pixels. Thus, an extremely large gain is applied if gain adjustment of the short-duration shot image is performed in accordance with that of the long-duration shot image as described in literature 1. Consequently, the pixel value of a lighter pixel becomes extremely large, resulting in the pixel value of a composite image also tending to concentrate near the upper limit and lower limit of the pixel values. If this is output to a monitor or the like, the gamma indicated by the dotted line in FIG. 14 is applied to the composite image, making a contrast extremely low in a high-luminance portion.

For the method described in literature 2, the S/N ratio of a sensor decreases in a dark pixel value, and thus the variance value of the local region of a reference pixel in the short-duration shot image is large, and the variance value of the local region in the long-duration shot image is small in a dark portion of a scene. Also in a light portion, the variance value of the local region in the short-duration shot image becomes large and in the long-duration shot image, pixel saturation occurs, and a local variance becomes small. As a result, a composite image with many of pixels forming the short-duration shot image is obtained if only the pixels of a large local variance are used and on the contrary, a composite image with many of pixels forming the long-duration shot image is obtained if the pixels of a small local variance are used. This makes it difficult to attain the effect of improving a dynamic range after composition.

SUMMARY OF THE INVENTION

The present invention has been made in consideration of the aforementioned problems, and provides a technique of obtaining, from a plurality of images different in exposure amount, an image with a wide dynamic range and a high contrast even after composition.

According to an aspect of the invention, there is provided an image processing apparatus which generates HDR (High Dynamic Range) image data from a plurality of image data different in exposure amount, the apparatus comprising: a first composition unit configured to generate first HDR image data by applying first gamma to each of the plurality of image data and composing the plurality of image data after application of the first gamma; a discrimination unit configured to discriminate, based on a light region which satisfies a preset condition, the light region, a dark region, and an intermediate region from one preset image data out of the plurality of image data if the one preset image data includes the light region; and a second composition unit configured to generate second HDR image data by applying second gamma different from the first gamma to one of the plurality of image data, and composing, in accordance with a discrimination result by the discrimination unit, image data obtained by applying the second gamma and the first HDR image data.

According to the present invention, it becomes possible to obtain, from the plurality of images different in exposure amount, the image with the wide dynamic range and the high contrast even after composition.

Further features of the present invention will become apparent from the following description of exemplary embodiments (with reference to the attached drawings).

BRIEF DESCRIPTION OF THE DRAWINGS

FIG. 15 is a flowchart showing the sequence of light region determination processing according to the second embodiment;

DESCRIPTION OF THE EMBODIMENTS

Embodiments according to the present invention will be described in detail below with reference to the accompanying drawings. Note that an example applied to an image capturing apparatus such as a digital camera serving as an image processing apparatus will be explained in each embodiment to be described below. However, this is merely an example, and the present invention is not limited to a description of embodiments below.

First Embodiment

[Outline]

The outline of the first embodiment will be described. In the first embodiment, four images different in exposure are input, normal gamma (first gamma) is applied to these images, and then the images are composed, generating HDR (High Dynamic Range) image data (to be referred to as basic HDR image data hereinafter). Then, this embodiment determines the presence of an image, in the four input images, that can be utilized to improve the contrast of a light portion. If there is not such an image, the basic HDR image data is decided as final HDR image data. On the other hand, if there exists the image that improves the contrast of the light portion, gamma (second gamma) different from the normal gamma is applied by utilizing that image, and then composition processing of the basic HDR image data and image data obtained by applying the second gamma is performed, generating and outputting HDR image data obtained with a further improved contrast of a light portion region. A more detailed description will be given below.

[Apparatus Arrangement]

Figure 1:
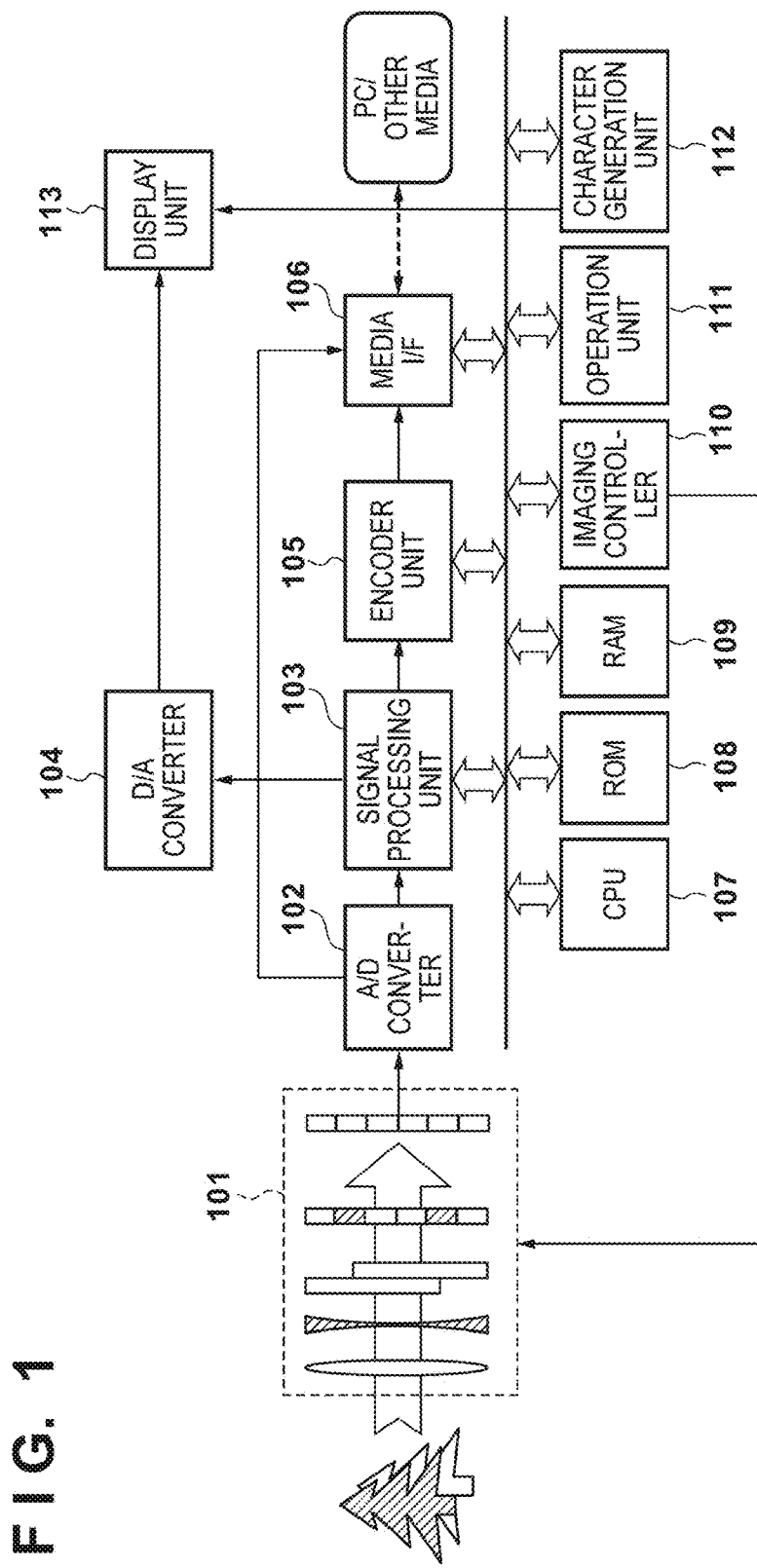
FIG. 1 is a block diagram showing the arrangement of an image processing apparatus according to the first embodiment.

FIG. 1 is a block diagram showing the arrangement of an image processing apparatus to which the first embodiment is applied. An image capturing unit 101 is a unit configured to detect light from an object, and is made of, for example, a zoom lens, a focus lens, a blur correction lens, a stop, a shutter, an optical low-pass filter, an iR cut filter, a color filter, a sensor such as a CMOS or a CCD, and the like. An A/D converter 102 is a unit configured to convert a detection amount of the light from the object into a digital value. A signal processing unit 103 is a unit configured to process a signal of the above-described digital value and generate a digital image. The signal processing unit 103 performs, for example, demosaicing processing, white balance processing, gamma processing, or the like. This signal processing unit 103 also performs image composition processing to be described in this embodiment. An encoder unit 105 is a unit configured to perform data compression on the above-described digital image and performs processing such as compression into Jpeg. A media interface unit 106 is an interface to be connected to a PC and other media (for example, a hard disk, a memory card, a CF card, an SD card, and a USB memory).

A CPU 107 involves all the processing of the respective units described above. A ROM 108 and a RAM 109 provide the CPU 107 with programs, data, work areas, and the like needed for the processing. The ROM 108 also stores control programs to be described later. Note that if the access speed of the RAM 109 is sufficiently faster than that of the ROM 108, the programs stored in the ROM 108 may be executed after temporarily loaded to the RAM 109.

An operation unit 111 is a unit which inputs an instruction from a user, and is made of, for example, buttons and a mode dial. A character generation unit 112 is a unit configured to generate characters and graphics. A D/A converter 104 is a unit configured to convert the above-described digital image into an analog image. A display unit 113 is a unit which displays a shot image or an image of a GUI or the like. In general, a CRT, a liquid crystal display, or the like is used for the display unit 113. Alternatively, the display unit 113 may be a known touch screen. In this case, an input by the touch screen can also be treated as an input by the operation unit 111.

An imaging controller 110 is a unit configured to perform the control of an imaging system instructed by the CPU 107 and performs control such as adjusting a focus, opening the shutter, adjusting the stop, and the like. Besides the above-described constituent elements, various constituent elements exist for a system configuration. However, they are not main subjects of the embodiment, and thus a description thereof will be omitted.

In the image composition processing shown in this embodiment, an image input portion ranges from image capturing by the image capturing unit 101 to A/D conversion by the A/D converter 102, the signal processing unit 103 performs image processing on image data obtained in the image input portion, and the CPU 107, the ROM 108, and the RAM 109 are utilized at that time. A detail of the image processing will be described below. Note that in a description below, the image data captured by the image capturing unit 101 is image data of a color space having three components R, G, and B, each of which is represented by 8 bits (256 tones). It is to be understood that this is for better understanding of technical contents by showing a concrete example, but this is merely an example.

[Sequence of Overall Processing]

The sequence of the image composition processing by the signal processing unit 103 in the image processing apparatus of the first embodiment will be described with reference to a flowchart of FIG. 2. This processing is processing when an HDR shooting mode by the operation unit 111 is set, and image capturing processing is performed. In the HDR shooting mode, when the user operates the operation unit 111 to operate an image capturing instruction (shutter button), the CPU 107 controls the imaging controller 110 to change a shutter speed stepwise and to capture four images $I_1$ to $I_4$ different in exposure amount. The relation of the exposure amounts is $I_1 > I_2 > I_3 > I_4$. It can be said here that the image $I_1$ has the largest exposure amount among four images, and thus for the image $I_1$, gradation in a dark portion of the object is maintained easily while a light portion of the object is likely to suffer from "blown out highlights". On the other hand, it can be said that for the image $I_4$, gradation in the light portion of the object is maintained easily while the dark portion of the object is likely to suffer from "blocked up shadows".

In step S201, the signal processing unit 103 inputs four image data $I_1$ to $I_4$ that have been captured by the image capturing unit 101 and have undergone A/D conversion by the A/D converter 102, and saves them in the RAM 109. Then, in step S202, the signal processing unit 103 applies the first gamma to the input image data $I_1$ to $I_4$ and also saves, in the RAM 109, the image data $I_1$ to $I_4$ after the gamma application. This is for making the images before the application of the first gamma reusable, as will be described later. The first gamma applied here is desirably gamma with less blocked up shadows or blown out highlights appearing while securing a wide dynamic range. Therefore, for example, log gamma as shown in FIG. 11A is applied in the embodiment.

Figure 11A:
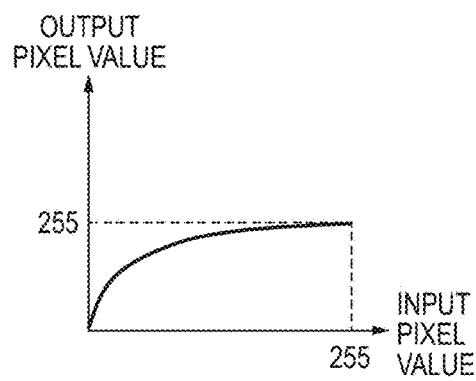
FIGS. 11A and 11B are graphs schematically showing the first gamma and the second gamma according to the first embodiment.
Figure 17:
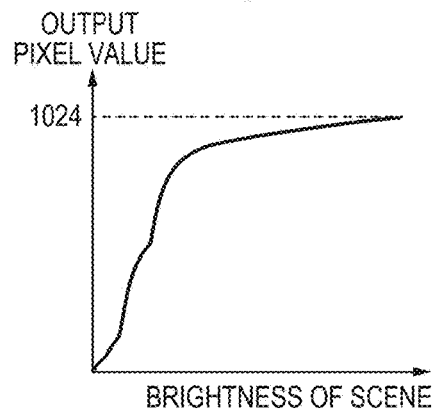
FIG. 17 is a graph showing an example of the luminance distribution of an HDR image.

If, for example, a 10-bit HDR composite image is output based on four image data $I_1$ to $I_4$ different in exposure condition as in this embodiment, the log gamma as shown in FIG. 11A has different output pixel values depending on input pixel values obtained from sensors of respective exposure images as in FIGS. 16A to 16D in accordance with the respective exposure conditions. It is possible, by composing these images after the gamma application, to obtain an HDR composite image having the output pixel value continuously with respect to the brightness of a shooting scene as shown in FIG. 17. Note that gamma other than this may be used, as a matter of course.

In step S203, the signal processing unit 103 performs the first image composition processing by using the image data $I_1$ to $I_4$ after the application of the first gamma, generates one image data with a wide dynamic range, and saves the generated image data in the RAM 109. The image data with the wide dynamic range generated in this composition processing will be referred to as basic HDR image data hereinafter.

Note that a method of generating the basic HDR image data itself utilizes known composition processing. A concrete example will be shown as below. Note that the first gamma has already been applied to image data in a description below.

A range indicating the brightness of the HDR image is divided into three (a value obtained by subtracting 1 from the number of images to be composed). Respective ranges are defined as R1, R2, and R3 in ascending order of the brightness.

The range R1 is a portion of low brightness, and thus image data $I_1$ and $I_2$ are used to generate image data I (R1) whose gradation is maintained especially in that range R1. The image data I (R1) is given by:

$$I(R1) = G(I_1, I_2)$$

wherein G(x, y) is a function indicating composition processing of an image x and an image y.

The image I (R2) whose gradation is maintained in the ranges R1 and R2 is given by:

$$I(R2) = G(I(R1), I_3)$$

Similarly, the image I (R3) whose gradation is maintained in all the regions R1 to R3 is given by:

$$I(R3) = G(I(R2), I_4)$$

It can be said that this image data I (R3) is the basic HDR image data described earlier.

Then, in this embodiment, it is determined whether the contrast of the light portion region of the object can further be improved from an original image. If it is determined that the contrast cannot further be improved, the basic HDR image data is output as an HDR composition result. On the other hand, if it is determined that the contrast can further be improved, new HDR image data with the contrast of the light portion region further improved from that in the basic HDR image data is generated and output as an HDR composition result. This processing is performed from step S204.

In step S204, the signal processing unit 103 uses the image data $I_3$ to which the first gamma is not applied to determine that a region having certain brightness and a comparatively large area (a detail of which will be described later) is included. The reason why the image data $I_3$ is selected as a determination target is as follows.

Image data having a smaller exposure amount can further maintain the contrast of a lighter region in an object image. The image data $I_4$ having the smallest exposure amount is considered to be good in this regard. However, the present inventor considers that the light region improved in contrast is preferably as wide as possible. To achieve this, the lower limit of the target light region is preferably low. Accordingly, the image data $I_3$ that can maintain even gradation in that intermediate region is selected as the determination target. Note that the user may be able to designate the image data to be determined, or the image data $I_2$ can be selected as the determination target in some cases.

In step S205, based on a determination result in step S204, the signal processing unit 103 determines whether the contrast of the light region can further be improved. If it is determined that the contrast of the light region cannot further be improved, the process advances to step S206 in which the signal processing unit 103 outputs, to the encoder unit 105, the basic HDR image data as composite image data indicating a composition result in this embodiment. The composite image data encoded by the encoder unit 105 is output to media via the media I/F 106 or stored in the RAM 109.

On the other hand, if it is determined that the contrast of the light region can further be improved, the signal processing unit 103 advances the process to step S207.

In step S207, based on information indicating the rough position of the light region calculated in step S204, the signal processing unit 103 decides a light region pixel indicating which pixel position in an input image is the light region and saves a decided result in the RAM 109. A decision on this light region pixel will be described in detail later.

In step S208, the signal processing unit 103 applies the second gamma different from the first gamma to the image data $I_4$ having the smallest exposure amount out of the input image data $I_1$ to $I_4$ saved in the RAM 109. Consequently, image data obtained by applying the second gamma will be denoted as image data L hereinafter.

Figure 11B:
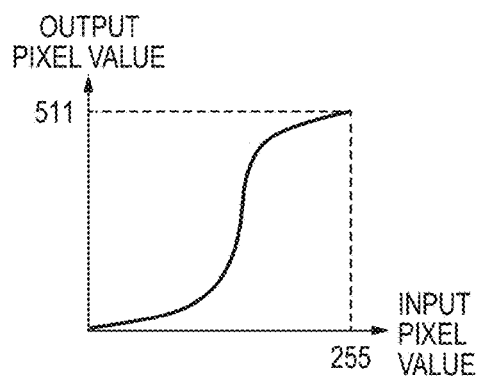

It is considered that the second gamma has an S-shaped curve with respect to the pixel value of the input image as shown in, for example, FIG. 11B and has the largest (or smallest) output pixel value different from that of the first gamma. The gamma is given in such a way, by applying this curve, that the output pixel value increases in a portion of certain brightness of the object in the scene as compared with a case in which there is no object complying with certain brightness in a scene, and the first gamma is applied, resulting in making it possible to improve gradation of the entire HDR image. Of course, no problem is posed even if the second gamma has gamma characteristics other than the S-shaped curve given here. It is desirable, however, that the second gamma is gamma in which a larger gradation levels are assigned to the light portion. Then, the signal processing unit 103 saves, in the RAM 109, the image data L after the application of the second gamma.

Then, in step S209, the signal processing unit 103 performs composition processing of the basic HDR image data and the image data L obtained by applying the second gamma, and generates the HDR image data with the improved contrast of the light region. Letting $I_{HDR}$ be an HDR image after the contrast of the light region is improved, the HDR image $I_{HDR}$ is given by:

$$I_{HDR}=G(I(R3),L)$$

Then, in step S210, the signal processing unit 103 outputs, to the encoder unit 105, the generated HDR image data as composite image data indicating the composition result in this embodiment. The composite image data encoded by the encoder unit 105 is output to the media via the media I/F 106 or stored in the RAM 109. The image composition processing in this first embodiment is completed by the above-described processing.

[Sequence of Light Region Determination Processing]

The light region determination processing of the captured image data $I_3$ in step S204 of FIG. 2 will now be described.

The light region determination processing roughly checks whether the region which is light and has the comparatively large area exists in the input image. In this first embodiment, the region which is light and has the comparatively large area is referred to as a light region. A detailed description is given below with reference to a flowchart of FIG. 3.

In step S301, the signal processing unit 103 performs color conversion to obtain a luminance component Y on the image data $I_3$ captured by the image capturing unit 101. If the image data is made of RGB, a conversion method may be a general transformation from RGB to one luminance component Y. Luminance image data generated by this conversion processing is saved in the RAM 109. Note that the luminance Y is also represented by 8 bits.

In step S302, the signal processing unit 103 divides the luminance image data generated in step S301 into a plurality of partial regions (pixel blocks) each having a preset size and obtains an average luminance value $Y_{AV}$ in each partial region.

Letting Y(x, y) be a luminance value at coordinates (x, y) in one partial region, the average luminance value $Y_{AV}$ in that partial region is given by:

$$Y_{AV}=\Sigma Y(x,y)/(p\times q) \quad (1)$$

wherein p is the number of pixels in a horizontal direction in the partial region, q is the number of pixels in a vertical direction in the partial region, and E represents a sum (integral) function when x is changed to 0, 1, . . . , p−1, and y is changed to 0, 1, . . . , q−1.

The image capturing unit 101 in the first embodiment captures image data of 2,400 pixels in the horizontal direction and 1,400 pixels in the vertical direction, and one partial region has the size of 100×100 pixels. In this case, the image data is divided into 24×14 partial regions (can also be referred to as reduced image data made of 24×14 pixels), and average luminance in each partial region is calculated.

Figure 5A:
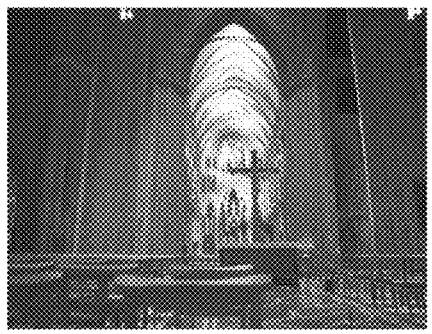
FIGS. 5A to 5C are views showing an original image and a luminance average image, and a histogram of the luminance average image used in the light region determination processing according to the first embodiment.
Figure 5B:
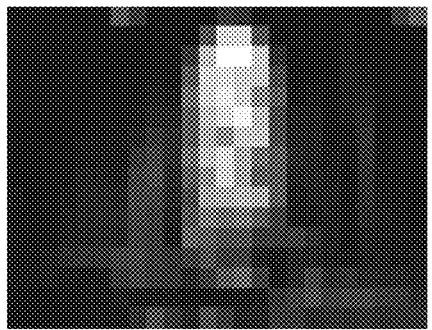
Figure 5C:
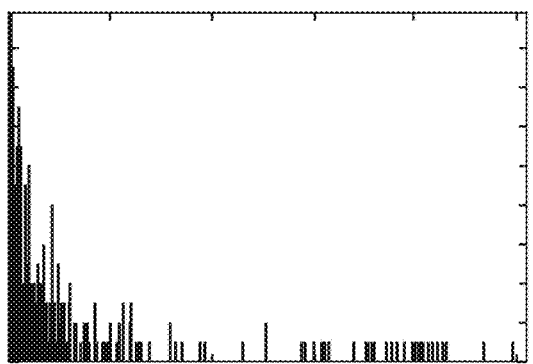

A state at this time will be described with reference to FIGS. 5A to 5C. FIG. 5A shows the target image data ($I_3$ in the embodiment). FIG. 5B shows an image (to be referred to as a luminance average image hereinafter) obtained by indicating each partial region with its average value.

In step S303, the signal processing unit 103 obtains a histogram with respect to the luminance average image obtained by step S302. The obtained histogram becomes, for example, as shown in FIG. 5C. A horizontal axis indicates a luminance value, and a vertical axis indicates a frequency (the number of partial regions).

Figure 6A:
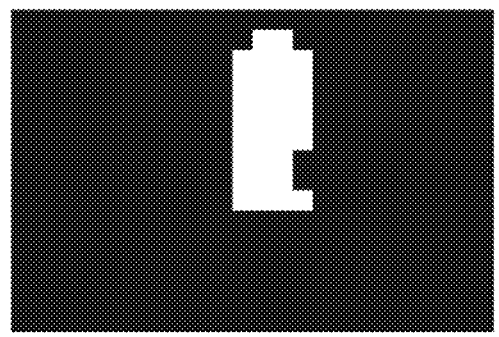
FIGS. 6A and 6B are views showing a light region schematic map and a histogram according to the first embodiment.
Figure 6B:
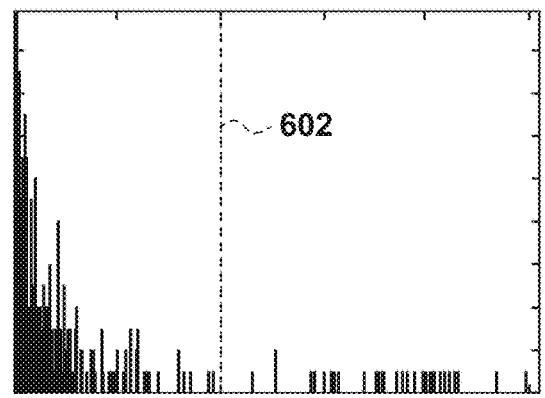

In step S304, the signal processing unit 103 obtains a binarization threshold TH from the luminance average image obtained in step S302 and performs binarization by using that threshold, obtaining a binarized image. A binarization method can be performed by a known algorithm. Typically, the binarization threshold TH is obtained by the Otsu method or the like, and binarization can be performed by using that threshold TH. FIG. 6A shows the binarized image. Note that in the embodiment, in the binarized image, a pixel with luminance equal to or larger than a threshold is "255", and a pixel with luminance smaller than the threshold is "0". The binarization threshold TH is set in a frequency portion capable of separating the histogram most accurately, as indicated by reference numeral 602 shown in FIG. 6B.

Figure 7:
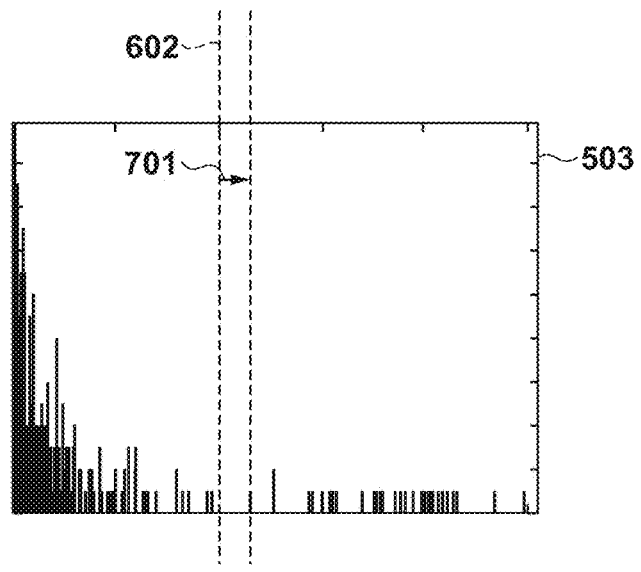
FIG. 7 shows a schematic histogram of a zero-section count according to the first embodiment.

In step S305, the signal processing unit 103 counts zero-sections in the histogram based on the binarization threshold obtained in step S304. More specifically, the signal processing unit 103 counts the number of bins each in which the frequency is "0" in a direction of increasing lightness with the binarization threshold 602 as a starting point, as shown in FIG. 7. Then, a bin range in which the frequency is 0 is defined as a zero-section 701. The signal processing unit 103 decides the field of search of the zero-section 701 by checking whether the zero-section 701 exists having a certain length (for example, the number of bins is "5") in a predetermined range with the binarization threshold 602 as the starting point. If the zero-section is found, the signal processing unit 103 stores, in the RAM 109, a determination result that the light region is found in an image data of interest. If the zero-section is not found, the signal processing unit 103 stores, in the RAM 109, a determination result that there is not the light region in the image data of interest.

Note that each of a method of deciding the field of search of the zero-section and the length of the zero-section described here is merely an example, and they may be decided by using another method in implementing this embodiment. For example, the length of the zero-section may be decided depending on the number of partial regions, or the user may be able to set the length as needed. In addition, the field of search of the zero-section may be searched for in both the increasing and decreasing directions or just on one side from the center of the binarization threshold 602.

Figure 8A:
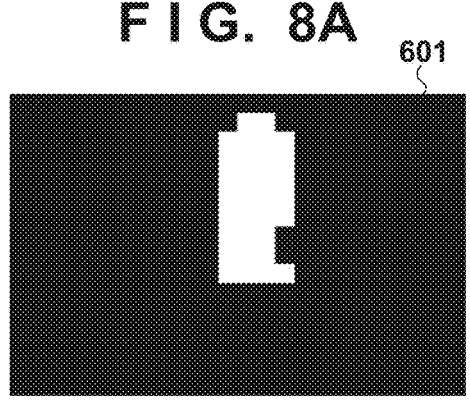
FIGS. 8A and 8B are views showing ternarization according to the first embodiment.
Figure 8B:
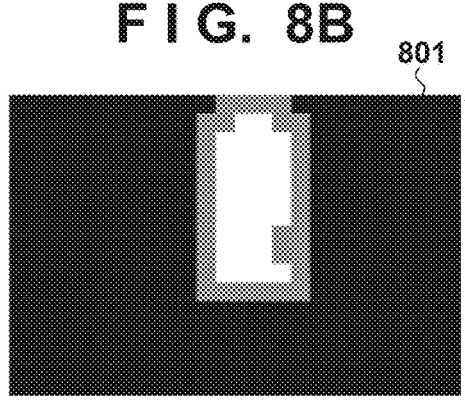

In step S306, based on the binarized image generated in step S304, the signal processing unit 103 sets a portion in which a pixel value contacts "255" to a pixel value "128" different from a pixel value "255" or "0" in a region with the pixel value "0", performing ternarization of the binarized image data. FIGS. 8A and 8B show an example of conversion from binarized image data 601 to ternarized image data 801. Each of FIGS. 8A and 8B shows that of the pixel value "0" (an illustrated black portion) in the binarized image data, the pixel value which contacts the pixel value "255" is "128" (an illustrated gray portion). An image in which a new pixel having the pixel value "128" exists around a region having the luminance equal to or larger than the binarization threshold is thus obtained. That is, each partial region that forms the image data is divided into a light portion region, a dark portion region, and an intermediate region thereof. Note that this ternarized image data is stored in the RAM 109.

If the process advances to step S309, the signal processing unit 103 outputs the ternarized image data as light region schematic map data. Note that if the zero-section 701 of a predetermined length is not found, the ternarized image data is not generated, and this process thus ends.

Figure 3:
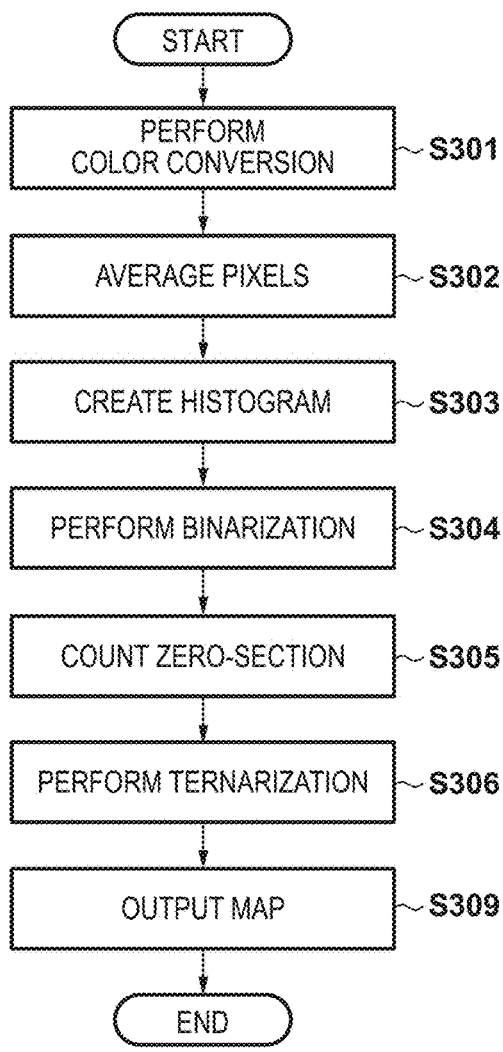
FIG. 3 is a flowchart showing light region determination processing according to the first embodiment.

Note that in the embodiment, the processing of FIG. 3 is performed on the image data $I_3$. However, the processing may be performed as follows.

First, the processing of FIG. 3 is performed on all the captured images $I_1$ to $I_4$, and it is determined that there is no light region if there is the zero-section of the predetermined length in none of them. Then, if there exists even one image data having the zero-section of the predetermined length, ternarized image data generated from image data having the smallest exposure amount among them is output as the light region schematic map data.

[Sequence of Light Region Pixel Decision Processing]

Figure 2:
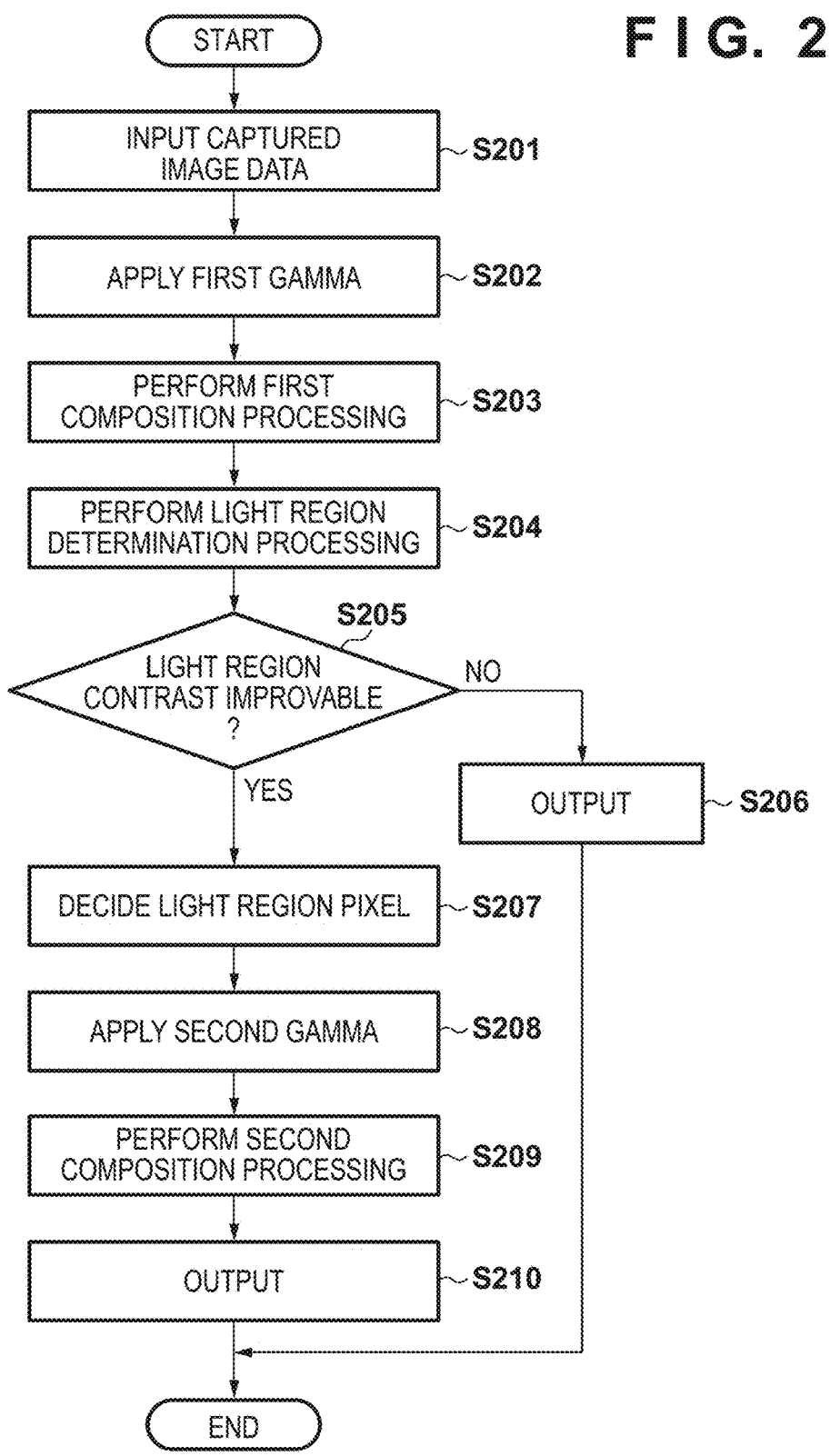
FIG. 2 is a flowchart showing overall image processing according to the first embodiment.

In the light region determination processing in step S204 of FIG. 2, it is determined whether there is the light region, and the light region schematic map data is created. In the light region pixel decision processing in step S207 of FIG. 2, light region map data for deciding, for each pixel, a portion serving as the light region in the input image is generated. The light region map data is information indicating to what ratio the basic HDR image data obtained by actually applying the first gamma and the image to which the second gamma is applied are composed, and is held as, for example, an 8-bit monochrome image. In this embodiment, the basic HDR image data generated by applying the first gamma is used for the dark portion region having the pixel value "0", the image data to which the second gamma is applied is used for the light portion region having the pixel value "255", and a pixel value obtained by composing the basic HDR image data and the image data obtained by applying the second gamma is output for the intermediate region having the pixel value "128". Note that it is only necessary that three pixel values can be discriminated, and thus they should not necessarily be any of 0, 128, and 255 by ternarization.

Figure 4:
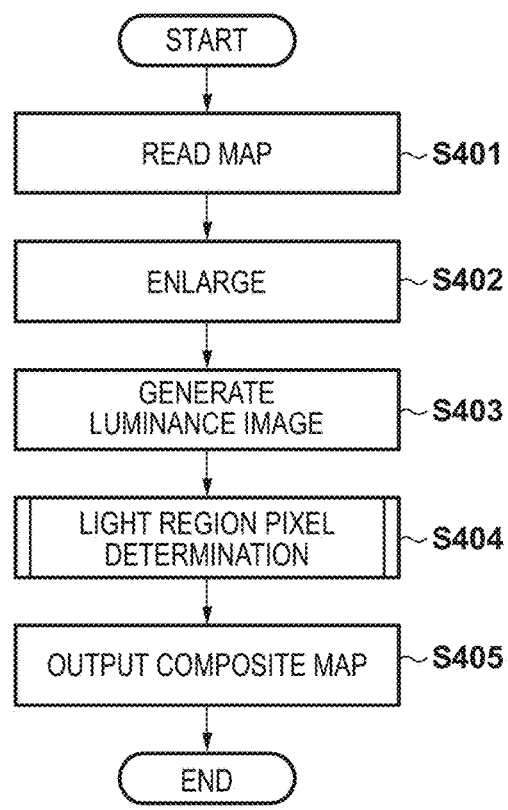
FIG. 4 is a flowchart showing the sequence of light region pixel decision processing according to the first embodiment.

The light region pixel decision processing will be described in detail with reference to a flowchart of FIG. 4.

In step S401, the signal processing unit 103 reads the light region schematic map data created in step S201.

In step S402, the light region schematic map data read in step S401 is enlarged to the same size as the input image, generating the light region map data. At this time, a nearest neighbor method is used for enlargement so as to avoid all the pixels in the light region map data from taking pixel values other than three values defined earlier.

In step S403, the input image (assumed to be the image data $I_3$ serving as the source of the light region schematic map data) stored in the RAM 109 is read, and luminance image data is generated. Conversion from RGB of the input image to the luminance Y can be performed by using the general transformation first. Then, smoothing processing using a Gaussian filter or the like is performed on image data constituted by only the luminance component obtained, generating the luminance image data.

In step S404, for each pixel, a location in the input image at which the light region is positioned is decided. More specifically, based on the light region map data generated in step S402, it is determined whether each pixel of the luminance image data is the light region pixel, a detail of which will be described later.

In step S405, data obtained by mapping the light region pixels generated in step S404 is output as a composite map data and stored in the RAM 109. The light region pixel decision processing in step S204 is completed by the above-described processing.

[Light Region Pixel Determination Processing]

Figure 9A:
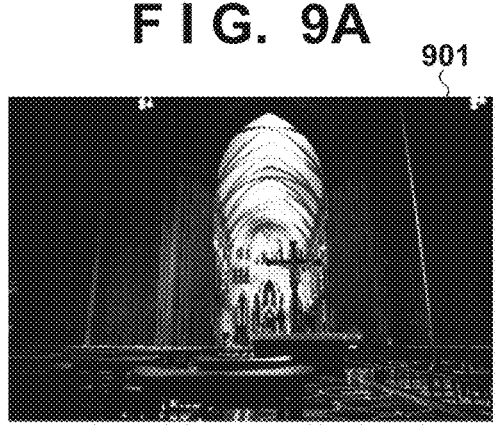
FIGS. 9A to 9C are views showing luminance image data, a light region map, and a composite map according to the first embodiment.
Figure 12:
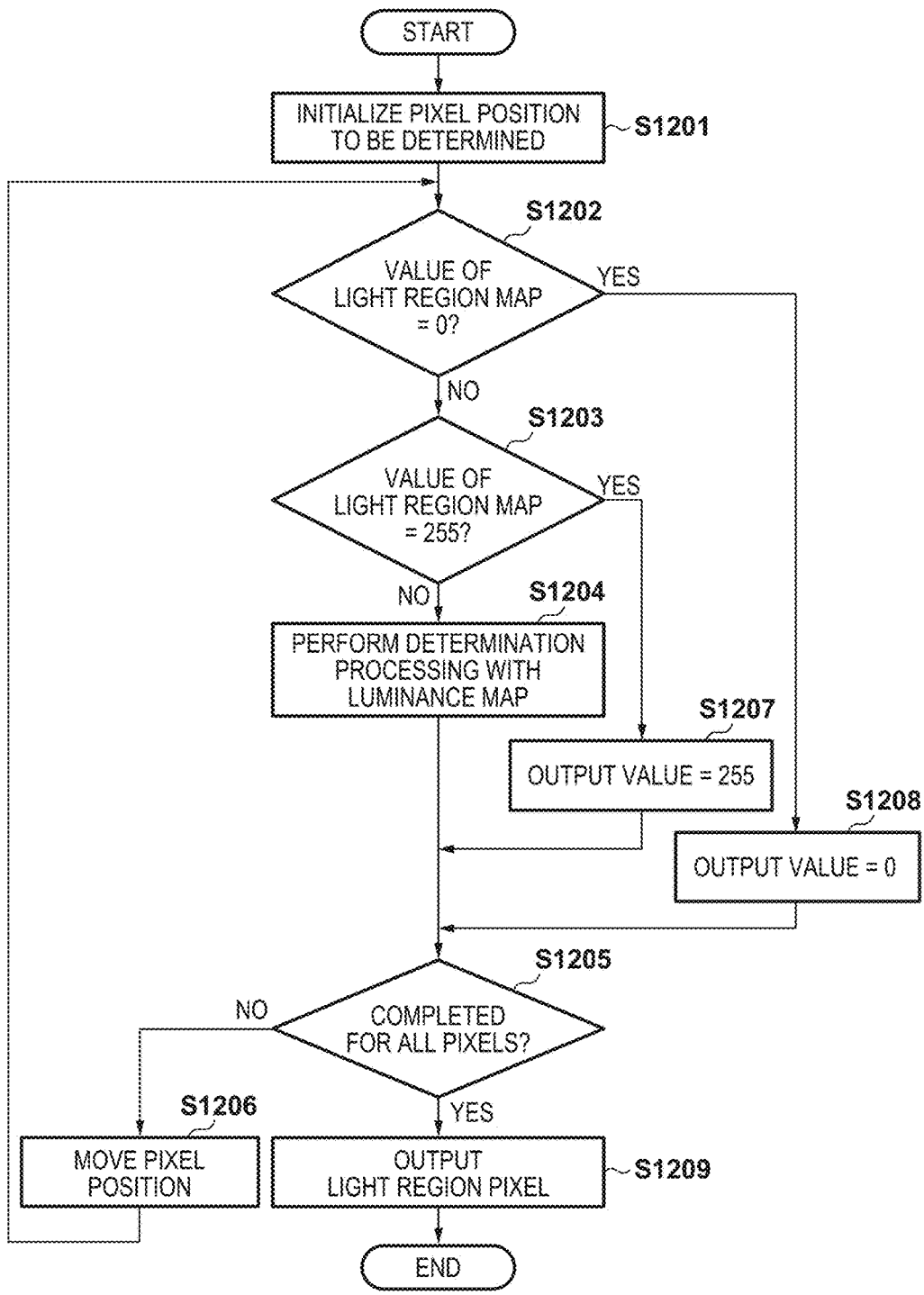
FIG. 12 is a flowchart showing composite map generation processing according to the first embodiment.

The light region pixel determination processing in step S404 will now be described in detail with reference to FIGS. 9A to 9C and a flowchart of FIG. 12.

In step S1201, the signal processing unit 103 first initializes a pixel position at which the light region pixel determination is performed. The signal processing unit 103 sets, for example, a pixel at the upper left corner of the input image data as a determination start position. Similarly, the signal processing unit 103 sets a pixel at the upper left corner of a light region map data 902 as a reference start position. Note that in a description below, the respective positions of a determination target pixel and a reference target pixel are updated in the raster scan order.

In step S1202, it is confirmed whether a value of the light region map data 902 corresponding to a determination target pixel position in the input image is "0". If the value is 0, the process advances to step S1208; otherwise, the process advances to step S1203.

In step S1203, it is confirmed whether a value of the light region map data 902 corresponding to the determination target pixel position in the input image is "255". If the value is "255", the process advances to step S1207; otherwise, the process advances to step S1204.

Figure 10:
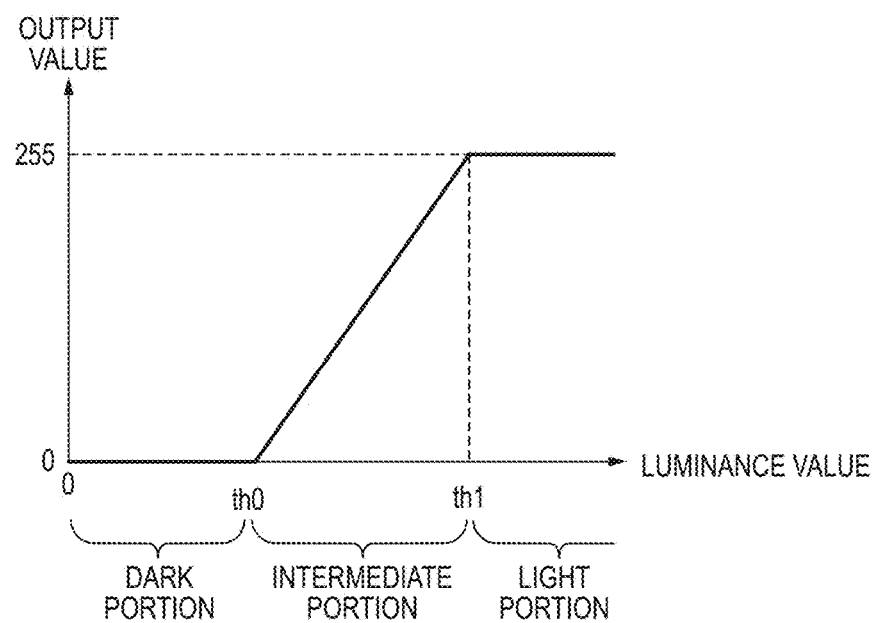
FIG. 10 is a graph showing a table for generating the composite map according to the first embodiment.

In step S1204, an output value of the light region pixel is decided. More specifically, as shown in FIG. 10, regarding the luminance image data as an input, a table for deciding a value to be output to the composite map data is given to decide an output value with reference to the table. Note that at this time, the output value may be 0 for a certain input value or smaller, and the output value may be 255 for the certain input value or larger. This portion is a portion positioned as a boundary in the composite map data. Therefore, it is likely that the light region and a portion other than this are mixed, and this needs to be determined strictly based on the brightness of the input image. Accordingly, the output value of the light region pixel is determined based on the luminance image data.

In step S1205, it is determined whether the light region determination processing for all the pixels has been completed. If it is determined that the processing has been completed, the process advances to step S1209; otherwise, the process advances to step S1206.

In step S1206, a determination target is moved to a next pixel position to be determined. For example, a position on the right side of the pixel, a left-end pixel one line below, or the like is to be determined.

In step S1207, the pixel value of the composite map data is set to "255". This portion is a region determined as definitely a light place in the light region map data, and thus the output value is "255". In step S1208, the pixel value of the composite map data is set to "0". In contrast to the former case, this portion is a region determined as definitely a dark place in the light region map data, and thus the output value is 0. In step S1209, generated composite map data 903 is output and stored in the RAM 109.

The light region pixel determination processing in step S404 and output processing of the composite map data are completed by the above-described processing. Note that the pixel values in the generated composite map data 903 can take values from 0 to 255.

[Image Composition Processing]

The image composition processing in steps S203 and S209 will be described.

A function G( ) described in step S203 is basically composite arithmetic processing of two image data as given by:

$$I_{Out} = G(I_{Short}, I_{Long}) \quad (2)$$
$$= I_{Out}(x, y)$$
$$= A \times I_{Short}(x, y) + (1 - A) \times I_{Long}(x, y)$$

wherein x and y are variables representing pixel positions, A is a composition ratio decided from a value of a pixel position (x, y) in the composite map data, $I_{Short}$ is an image having a small exposure amount, and $I_{Long}$ is an image having a large exposure amount. A method of generating the composition ratio A will now be described.

Figure 13:
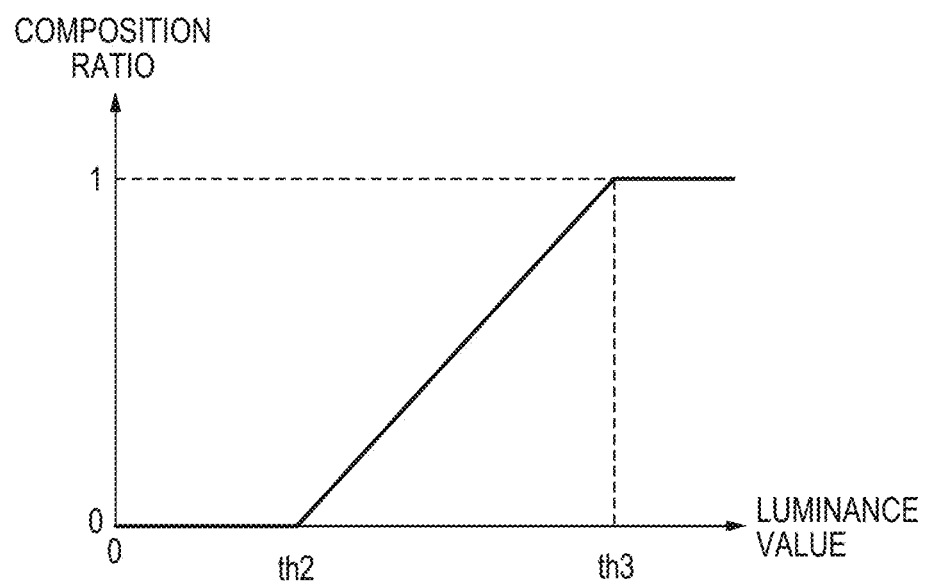
FIG. 13 is a graph showing the relationship between the composite map and the composition ratio according to the first embodiment.

The luminance component of the image $I_{Short}$ is used to derive the composition ratio A. The luminance component of each pixel is obtained from the image $I_{Short}$, performing the smoothing processing. For example, a Gaussian filter of 5×5 can be used for the smoothing processing. The output values of the composite map data are referred to with respect to the luminance components after the smoothing processing, as shown in FIG. 13. As a result, the value of the composition ratio A in each pixel is decided. In FIG. 13, a method of deciding A sets thresholds th2 and th3, sets the output value to 0 if luminance is less than th2, sets the output value to 1 if the luminance is more than th3, and uses a result obtained by linear interpolation between th2 and th3.

In step S203, arithmetic operations are performed on the image data $I_1$ to $I_4$ by applying equation (2). Note that the thresholds th2 and th3 in the arithmetic operations are values decided in advance from the relationship between two images to be composed.

The composition processing in step S209 will now be described. In the composition processing in step S209, the image data $I_{Short}$ in equation (2) is the image data L after the application of the second gamma, and the image data $I_{Long}$ is the basic HDR image. Then, the composite map data 903 generated in step S405 of FIG. 4 is used as composite map data A. Since the pixel values of the composite map data 903 obtained in step S405 of FIG. 4 take the values from 0 to 255, the composition ratio uses a value obtained by dividing the pixel values of the composite map data by 255. That is, letting M be a value at the coordinates (x, y) of the composite map data, the composition ratio A=M/255.

Figure 9B:
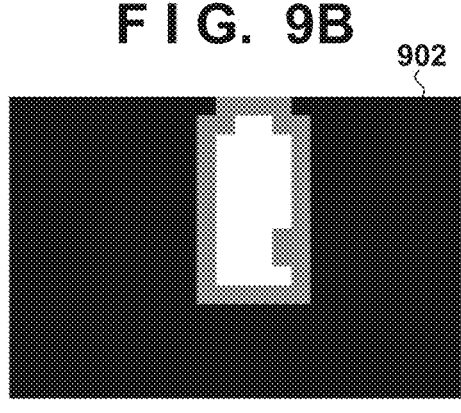
Figure 9C:
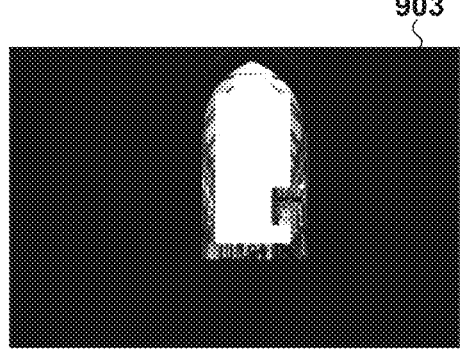

As seen from equation described above, it is shown that a "0" region in the composite map data 903 corresponds to a dark region in FIG. 9B, and the basic HDR image data is used to emphasize or maintain the gradation of that region. On the contrary, it is shown, in a light region, that the image data L to which the second gamma is applied is used. Then, in an intermediate portion, the basic HDR image data and the image data L are composed based on the composite map data. As a result, it is possible, in the light region, to further improve the contrast as compared with the basic HDR image.

As described above, according to this embodiment, when the HDR image data is generated from the plurality of images different in exposure condition, it is determined whether a predetermined image out of the plurality of images satisfies a preset lightness condition and if the predetermined image does not satisfy the condition, the normal first gamma is applied to each image, generating the normal HDR image. Then, if the predetermined image out of the plurality of images satisfies the preset lightness condition, it becomes possible to generate, from the image and the normal HDR image, an HDR image with a further improved contrast of a lightness region.

Second Embodiment

[Outline]

The outline of the second embodiment will be described. In the second embodiment, two images different in exposure are input, and it is judged, based on an input image of either of them, whether to improve the contrast of a light portion. Then, if it is judged that visibility can be improved, image composition is further performed after image processing different from normal one and normal image composition processing is performed on an image selected when composition operations different in exposure are performed. If it is not judged that the contrast can be improved, only the normal image composition processing is performed. Note that this second embodiment describes only a difference from the first embodiment.

The difference from the first embodiment is the light region determination processing of the shot images in step S204 and, more particularly, a method of outputting the light region schematic map data in step S309.

Figure 14:
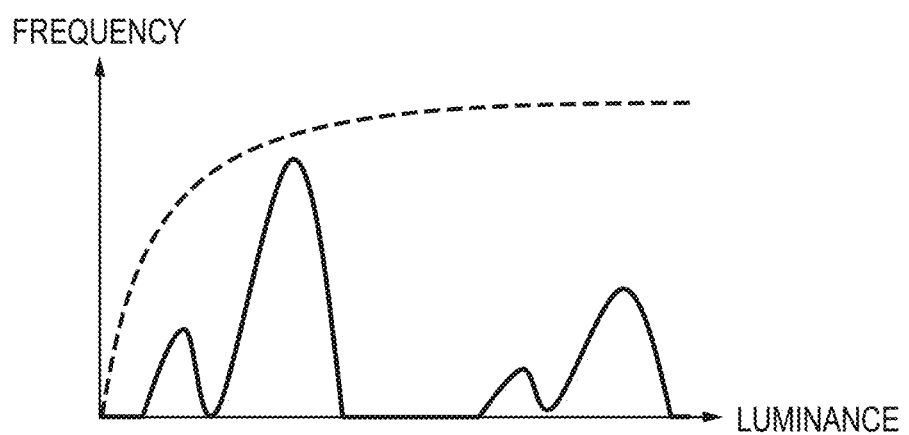
FIG. 14 is a graph showing the luminance distribution and the tendency of gamma in a scene with a wide dynamic range.
Figure 16A:
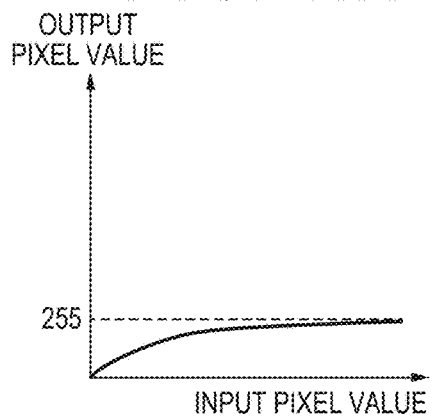
FIGS. 16A to 16D are graphs showing gamma curves applied to four normal images.
Figure 16B:
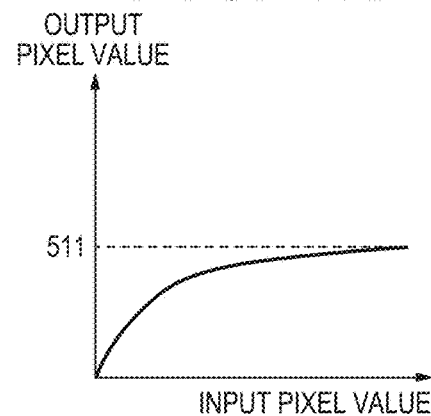
Figure 16C:
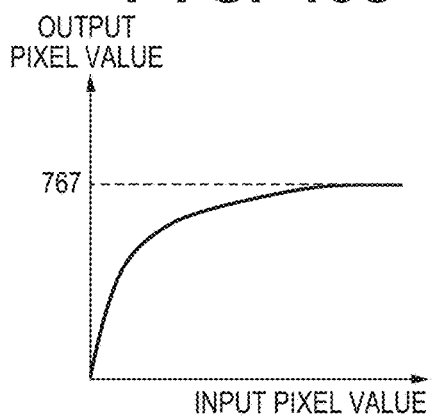
Figure 16D:
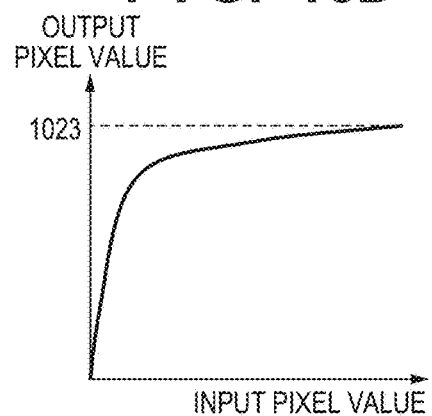

As outputting light region schematic map data of this second embodiment, processing can be performed only on the image having a smaller exposure amount. This is because the contrast is hardly reduced even if gamma as in FIG. 14 is applied to a shot image inevitably having a narrow luminance range of a capturable scene and a larger exposure amount when the number of images to be composed is two. Accordingly, in output processing of map data in step S309, a binarized image obtained based on a shot image having a small exposure amount is output at step S310. FIG. 15 is a flowchart showing the output processing of light region schematic map data according to this second embodiment. A difference from FIG. 3 is that there are two images used for composition as described above, and thus the processing is completed by one path.

Third Embodiment

The third embodiment will be described. In the third embodiment, an example will be described in which assuming four images different in exposure to be one set, a plurality of sets arranged time-serially, that is, a moving image is processed. Then, in the third embodiment, images for one set of interest are input, an image that satisfies a predetermined condition among them is specified, and it is judged, based on that image, whether the contrast of a light portion can be improved. Then, if it is judged that visibility can be improved, image composition for improving visibility is further performed in a current frame based on to what extent the image composition has been performed in a preceding frame after gamma conversion on a gamma conversion condition different from a normal one and normal gamma conversion is performed on an image selected when composition operations different in exposure are performed. A further detailed description will be given below. Note that this third embodiment describes only a difference from the first embodiment.

In the third embodiment, information held in a RAM 109 holds, in addition to the image data obtained in the image input portion described in the first embodiment, a composition ratio Ip representing to what extent the second gamma image is composed to the first gamma when an HDR composite image in the preceding frame is output and a composition ratio In indicating to what extent the second gamma image in the current frame is composed. The way in which these data are utilized will be described below.

Figure 18:
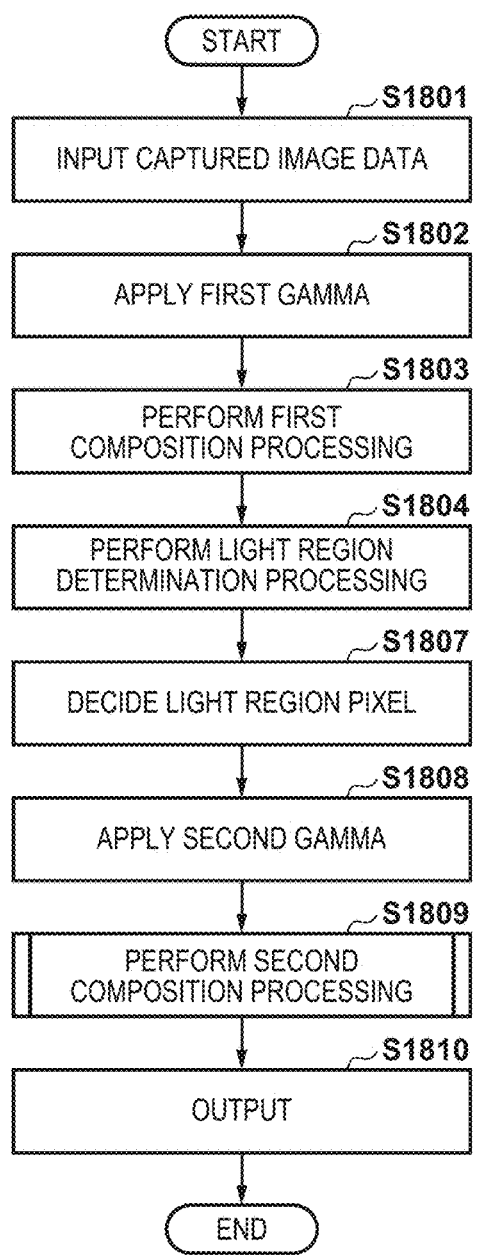
FIG. 18 is a flowchart showing image processing according to the third embodiment.

FIG. 18 shows the sequence of image composition processing in a signal processing unit 103 of an image processing apparatus according to the third embodiment. Steps S1801 to S1803 are the same as steps S201 to S203 of FIG. 2, and steps S1807 and S1808 are the same as steps S207 and S208. Steps S1804 and S1809 are different from the first embodiment.

In step S1804, the signal processing unit 103 judges whether the contrast of a light region can be improved and decides a numerical value to be substituted in a variable JL to be described later. If judging that the contrast of the light region can be improved, the signal processing unit 103 substitutes 255 in the variable JL. If judging that the contrast of the light region cannot be improved, the signal processing unit 103 substitutes 0 in the variable JL.

In step S1809, the signal processing unit 103 performs image composition by using images after the application of the first and second gammas created in steps S1802 and S1808, and generates an image with a wide dynamic range. Based on a result in step S1804, image composition is performed by using the composition ratio Ip of the images after the application of the first and second gammas, and the HDR composite image in the preceding frame held in the RAM 109, a detail of which will be described later.

Figure 19:
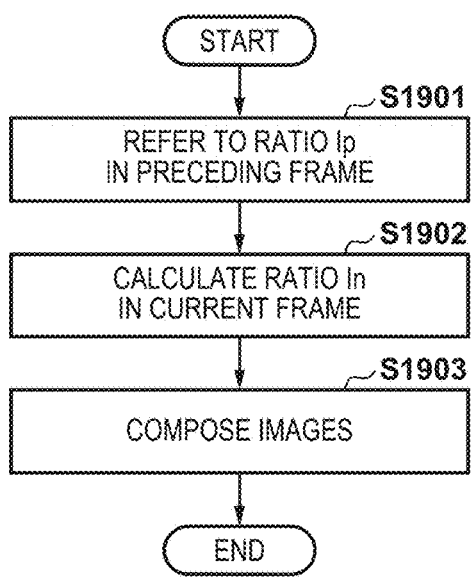
FIG. 19 is a flowchart showing composition processing of the second gamma image according to the third embodiment.

FIG. 19 is a flowchart showing the sequence of composition processing of the second gamma image in step S1806 in the image processing apparatus according to the third embodiment.

In step S1901, the signal processing unit 103 obtains the composition ratio Ip of the second gamma image in the preceding frame held in the RAM 109. Note that Ip is represented by, for example, an integer from 0 to 255.

In step S1902, the signal processing unit 103 calculates the composition ratio In of the second gamma image in the current frame, for example, as given by:

$$In = Ip + Kp*(JL-Ip) + Ki*(JL-Ip) \quad (3)$$

The obtained In is held in the RAM 109. Note that a determination result of whether there is the light region obtained in step S203 in the current frame is used for JL. If there is the light region, 255 obtained in step S1804 earlier is used for the substitution. If there is not the light region, 0 is used for the substitution. Kp and Ki are control parameters, and, for example, Kp=0.5 and Ki=0.3 can hold.

In step S1903, based on In obtained in step S1902, the signal processing unit 103 composes the second gamma image to the first gamma image as given by:

$$I_{Out3}(x,y) = In \times A/255 \times I_{Local}(x,y) + (255-In) \times ((255-A)/255) \times I_{Out1}(x,y) \quad (4)$$

wherein A is a composite map generated in step S204. Then, In is utilized for composition as Ip in a next frame.

When the second gamma is composed by thus adding In, the degree of composition of the second gamma image does not vary largely even if a value of A varies largely for each frame or a result in step S203 changes for each frame. This makes it possible to obtain an image with a small change when the composite image is regarded as the moving image.

As described above, in the third embodiment, it is possible to provide an easy-to-see image without causing a large image change in an output image even if whether to compose the second gamma changes for each frame.

Other Embodiments

In the first and second embodiments, the effect of improving the contrast is attained with two types of gamma conversion. However, the present invention is not limited to this. In addition to gamma conversion, another tone curve such as polygonal line gamma may be used. Also at this time, the tone curve for improving a contrast desirably has large gradation levels in a light region or a dark region whose contrast should be improved.

The number of image data utilized for composition processing is four in the first embodiment and two in the second embodiment. Needless to say, however, a generalization can be made to N (where N≥2) images.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-119150, filed Jun. 15, 2016, and No. 2017-054872, filed Mar. 21, 2017, which are hereby incorporated by reference herein in their entirety.

What is claimed is:

1. An image processing apparatus which generates HDR (High Dynamic Range) image data from a plurality of image data different in exposure amount, the apparatus comprising:
one or more processors; and
at least one memory, the at least one memory having stored thereon instructions executable by the one or more processors,
wherein the execution of the instructions causes the image processing apparatus to function as units comprising:
(1) a discrimination unit configured to discriminate whether or not one preset image data of the plurality of image data includes a light region; and
(2) a composition unit configured to generate HDR image data by, in accordance with a discrimination result by the discrimination unit, applying at least one of first gamma or second gamma different from the first gamma to each of the plurality of image data, and composing a plurality of image data obtained by applying at least one of the first gamma or the second gamma,
wherein the composition unit, in a case that the discrimination unit discriminates that the one preset image data includes the light region, calculates a pixel value using a pixel value obtained as a result of applying the first gamma to at least one of the plurality of image data in an area not discriminated to be the light region without using a result of applying the second gamma to the plurality of image data, and calculates a pixel value using a pixel value obtained as a result of applying the second gamma to at least one of the plurality of image data in the region discriminated to be the light region,
wherein the first gamma is gamma which emphasizes gradation of a dark portion, and
wherein the second gamma is gamma which emphasizes gradation of a light portion.

2. The apparatus according to claim 1, wherein the discrimination unit uses, out of the plurality of image data different in exposure amount, one image data other than image data having the largest exposure amount and image data having the smallest exposure amount as the one preset image data.

3. The apparatus according to claim 1, wherein the composition unit generates first HDR image data by applying the first gamma to each of the plurality of image data and composing a plurality of image data obtained by the application of the first gamma without using the second gamma, and
wherein the image processing apparatus outputs the first HDR image data if the discrimination unit determines that the one preset image data does not include the light region.

4. The apparatus according to claim 1, wherein the discrimination unit includes:
a conversion unit configured to convert the one preset image data into luminance image data made of only a luminance component;
a histogram generation unit configured to divide the luminance image data into a plurality of pixel blocks each being formed by a predetermined number of pixels, calculate an average luminance value of each pixel block, generate reduced image data having the average luminance value as a component, and obtain a histogram of a luminance value of the reduced image data;
a calculation unit configured to calculate, from the histogram, a threshold for dividing the reduced image data into a light portion and a dark portion in accordance with a predetermined algorithm; and
a bin determination unit including a bin indicated by the threshold in the histogram and configured to determine whether a frequency of continuous bins of the predetermined number is 0, and
wherein the discrimination unit determines that the one preset image data out of the plurality of image data includes the light region which satisfies a preset condition if there exist the continuous bins of the predetermined number with the frequency of 0.

5. The apparatus according to claim 4, wherein the discrimination unit includes a generation unit configured to generate map data for discriminating the light region, a dark region, and an intermediate region from the one preset image data, and
wherein the generation unit includes:
(a) a binary image generation unit configured to generate binary image data which discriminates the light portion and the dark portion of the reduced image data based on the light portion and the threshold,
(b) a ternary image generation unit configured to change, to an intermediate portion, a pixel which contacts a region of the light portion of a pixel belonging to a region of the dark portion in the generated binary image data and generate ternary image data which discriminates a light portion, a dark portion, and an intermediate portion, and
(c) an enlargement unit configured to enlarge the generated ternary image data to a size of an original image,
wherein the generation unit generates the map data from the ternary image data obtained by enlargement, and
wherein the composition unit applies the first gamma to each of the plurality of image data and combines a plurality of image data obtained by the application of the first gamma, thereby generating a first HDR image data, and composes the image data obtained by applying the second gamma to one of the plurality of image data and the first HDR image data with reference to the map data to generate and output second HDR image data.

6. The apparatus according to claim 1, wherein the first gamma is log gamma.

7. The apparatus according to claim 1, wherein the execution of the instructions stored in the at least one memory further causes the image processing apparatus to function as units comprising:
a generation unit configured to generate, based on a light region which satisfies the condition, map data for discriminating the light region, a dark region, and an intermediate region from the one preset image data if the determination unit determines that the one preset image data includes the light region; and
a map data correction amount calculation unit configured to calculate a correction amount of the map data from a determination result by the determination unit and a determination result by the determination unit of a preceding frame,
wherein the composition unit (a) applies the first gamma to each of the plurality of image data and combines a plurality of images obtained by applying the first gamma to thereby generate a first HDR image data, and (b) generates second HDR image data by applying second gamma different from the first gamma to one of the plurality of image data, and composing, with reference to map data corrected with the correction amount calculated by the map data correction amount calculation unit, image data obtained by applying the second gamma and the HDR image data.

8. The apparatus according to claim 1, wherein, if the discrimination unit discriminates that the one preset image data includes the light region, the composition unit applies the first gamma to at least two of the plurality of image data for regions other than the light region, and applies the second gamma to at least one of the plurality of image data for the light region.

9. The apparatus according to claim 1, wherein, if the discrimination unit discriminates that the one preset image data includes the light region, the composition unit (a) in regions other than the light region, composes image data obtained by applying the first gamma to at least two of the plurality image data in accordance with a pixel value in a predetermined one image data of the plurality of image data, and (b) in the light region, composes image data obtained by applying the first gamma to at least two image data of the plurality of image data and image data obtained by applying the second gamma to at least one image data of the plurality of image data.

10. A control method of an image processing apparatus which generates HDR (High Dynamic Range) image data from a plurality of image data different in exposure amount, the method comprising:

discriminating whether or not one preset image data of the plurality of image data includes a light region; and generating HDR image data by, in accordance with a discrimination result by the discriminating, applying at least one of first gamma or second gamma different from the first gamma to each of the plurality of image data, and composing, a plurality of image data obtained by applying at least one of the first gamma or the second gamma, wherein the composing, in a case that the discriminating discriminates that the one preset image data includes the light region, calculates a pixel value using a pixel value obtained as a result of applying the first gamma to at least one of the plurality of image data in an area not discriminated to be the light region without using a result of applying the second gamma to the plurality of image data, and calculates a pixel value using a pixel value obtained as a result of applying the second gamma to at least one of the plurality of image data in the region discriminated to be the light region, wherein the first gamma is gamma which emphasizes gradation of a dark portion, and wherein the second gamma is gamma which emphasizes gradation of a light portion.

11. A non-transitory computer-readable storage medium storing a computer program which causes, when read and executed by a computer, the computer to execute steps of a method which generates HDR (High Dynamic Range) image data from a plurality of image data different in exposure amount, the method comprising:

discriminating whether or not, one preset image data of the plurality of image data includes a light region; and generating HDR image data by, in accordance with a discrimination result by the discriminating, applying at least one of first gamma or second gamma different from the first gamma to each of the plurality of image data, and composing a plurality of image data obtained by applying at least one of the first gamma or the second gamma, wherein the composing, in a case that the discriminating discriminates that the one preset image data includes the light region, calculates a pixel value using a pixel value obtained as a result of applying the first gamma to at least one of the plurality of image data in an area not discriminated to be the light region without using a result of applying the second gamma to the plurality of image data, and calculates a pixel value using a pixel value obtained as a result of applying the second gamma to at least one of the plurality of image data in the region discriminated to be the light region, wherein the first gamma is gamma which emphasizes gradation of a dark portion, and wherein the second gamma is gamma which emphasizes gradation of a light portion.

* * * * *